United States Patent [19]

Koneval

[11] Patent Number: 4,726,232
[45] Date of Patent: Feb. 23, 1988

[54] TEMPERATURE COEFFICIENT COMPENSATED PRESSURE TRANSDUCER

[75] Inventor: Donald J. Koneval, Brookfield, Wis.

[73] Assignee: Gould Inc., Rolling Meadows, Ill.

[21] Appl. No.: 869,744

[22] Filed: Jun. 2, 1986

[51] Int. Cl.⁴ .................. G01L 7/08; G01L 9/06; G01L 19/04
[52] U.S. Cl. .................. 73/708; 73/721; 73/727; 338/3; 338/4; 338/42
[58] Field of Search .................. 73/708, 721, 727, 754, 73/DIG. 4; 338/4, 42, 3

[56] References Cited

FOREIGN PATENT DOCUMENTS 0626374  9/1978  U.S.S.R. .................. 338/3
0746218  7/1980  U.S.S.R. .................. 73/708

*Primary Examiner*—Donald O. Woodiel
*Attorney, Agent, or Firm*—Lyon & Lyon

[57] ABSTRACT

A pressure transducer, which includes a silicon diaphragm with ion-implanted resistors in Wheatstone Bridge configuration and in insulating layer covering the diaphragm, is provided with temperature compensation for differences in thermal expansion coefficients of the layers by depositing a layer of aluminum onto the central portion of the diaphragm.

9 Claims, 6 Drawing Figures

TEMPERATURE COEFFICIENT COMPENSATED PRESSURE TRANSDUCER

BACKGROUND OF THE INVENTION

This invention relates generally to pressure transducers of the strain gage type and more particularly to pressure transducers having zero temperature coefficient (zero TC) compensation. A strain-gage type pressure transducer converts a physical displacement into an electrical signal. Strain-gage type pressure transducers have been manufactured using integrated circuit technology for numerous applications. A typical miniature pressure transducer includes a thin silicon diaphragm into which resistors are diffused or implanted and then connected to form a Wheatstone Bridge circuit. While these pressure transducers offer many advantages, such as their use as disposable blood pressure transducers, they do not give consistent results in environments with varying temperatures. Inconsistent results due to temperature variation is caused by the different thermal expansion coefficients of the two or more layers of the composite forming the diaphragm, slight variations in the temperature coefficients of resistance (TCR) of individual bridge elements, thermal gradients between elements, or any combination of these causes.

Prior art schemes for providing zero TC compensation include on-chip and off-chip resistive compensation. Since the silicon diaphragm transducer is miniaturized, many manufacturers use circuitry on additional chip(s) which is electrically connected to the diaphragm chip to provide zero TC compensation. While this scheme can provide acceptable zero TC compensation in many cases, the use of off-chip circuitry is not always convenient for applications requiring greater miniaturization and may not adequately compensate a unit in which a temperature differential exists between the diaphragm and compensation chips.

A prior art method of providing on-chip zero TC compensation is shown in FIG. 2. In this pressure transducer, thin-line aluminum resistors are deposited on the edge of the diaphragm chip, outside the diaphragm and electrically connected in the bridge circuit. Aluminum has a temperature coefficient of resistance (TCR) of about 3900 ppm/degree C., while the diffused bridge resistors would typically have a design value between 1000 and 2000 ppm/degree C. The effective TCR of the Wheatstone Bridge arms that include the aluminum resistors would then be greater and as a result a zero TC would be induced to compensate the transducers. While the structure of FIG. 2 is useful for providing zero TC, it is expensive to manufacture and requires tight processing control. For example, the amount of zero TC compensation provided by the aluminum resistors of FIG. 2 depends on the following parameters: aluminum resistor TCR and ohmic value (i.e. line width, thickness, and resistivity); TCR of the diffused bridge resistor; and bridge impedance. Of these factors, variations in line width or thickness provide the major shifts in compensation variables. In addition, since the compensation resistors are in series with the bridge resistors, bridge balance is coupled with zero TC compensation and thus will also shift with variations in the value of the aluminum resistors.

Therefore, it is an object of the present invention to provide a pressure transducer having zero TC compensation which is independent of bridge balance.

It is another object of the present invention to provide a pressure transducer having zero TC compensation which is simple to manufacture and requires a minimum of processing control.

It is yet another object of the present invention to provide a pressure transducer with improved on-chip zero TC compensation.

Additional objects, advantages, and novel features of the invention will be set forth in part in the description which follows, and in part will become apparent to those skilled in the art upon examination of the following or may be learned by practice of the invention.

SUMMARY OF THE INVENTION

To acheive the foregoing and other objects, a pressure transducer may comprise a diaphragm, the diaphragm being formed of a material having a first thermal expansion coefficient; measuring means for measuring the displacement of the diaphragm in response to an applied pressure including four piezoresistive resistors disposed on the diaphragm and connected as the elements of a Wheatstone Bridge circuit, the resistors being positioned near the edges of the diaphragm; an insulation layer covering the diaphragm and insulating the diaphragm from the circuit connections of the measuring means, the insulation layer being formed of a second material having a second thermal expansion coefficient; and a compensation layer on the insulation layer, the compensation layer being formed of a third material having a third thermal expansion coefficient, wherein the size of the compensation layer is chosen such that the pressure transducer has a particular value of temperature compensation.

By judicious choice of the compensation layer material, zero TC is accomplished without the use of additional resistors affecting overall bridge balance.

BRIEF DESCRIPTION OF THE DRAWINGS

The present invention is illustrated in the accompanying drawings wherein.

DETAILED DESCRIPTION OF THE INVENTION

Figure 1:
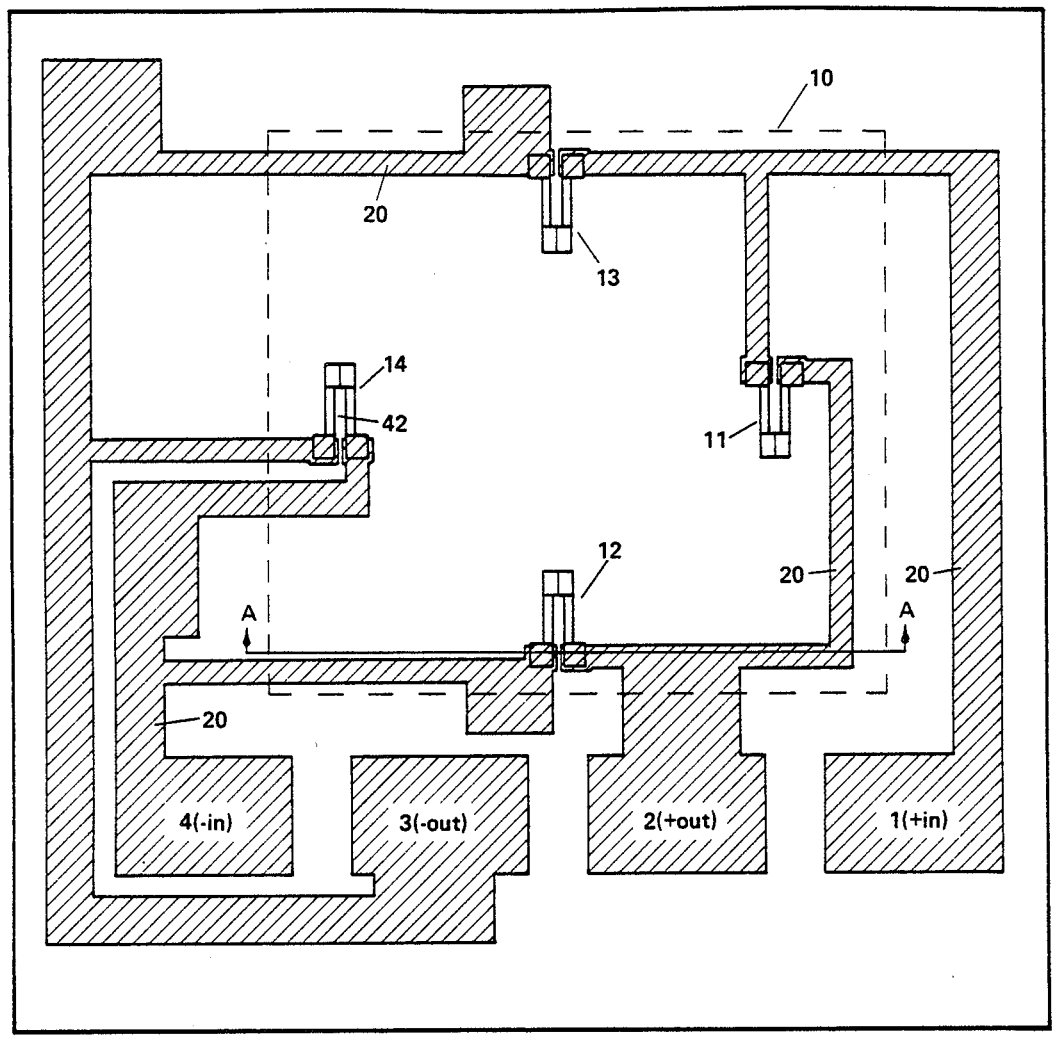
FIG. 1 is a plan view of a diaphragm pressure transducer without zero TC compensation.
Figure 1A:
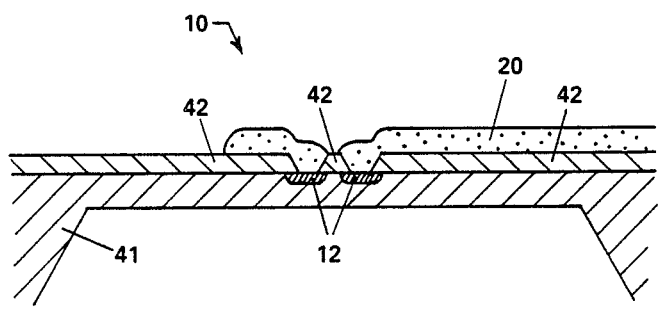
FIG. 1A is a cross-section along line A—A of the diaphragm pressure transducer of FIG. 1.

Referring to FIGS. 1 and 1A, a typical silicon diaphragm pressure transducer is shown. A large substrate of silicon 41 is etched to form the thin diaphragm region denoted by numeral 10. Silicon dioxide layer 42 covers the silicon to provide insulation between the silicon and the circuit metallization shown by numeral 20 that connects resistors 11, 12, 13, 14. In this transducer, four resistors 11 through 14 are formed by first etching the silicon dioxide layer at the locations shown, followed by diffusion or ion implantation. Resistors 11 through 14 are shown connected in a Wheatstone Bridge circuit. The input and output of the bridge circuit is shown by metallization areas 4 and 1, and 2 and 3 respectively.

Resistors 11 through 14 are shown implanted near the edges of the diaphragm.

Figure 2:
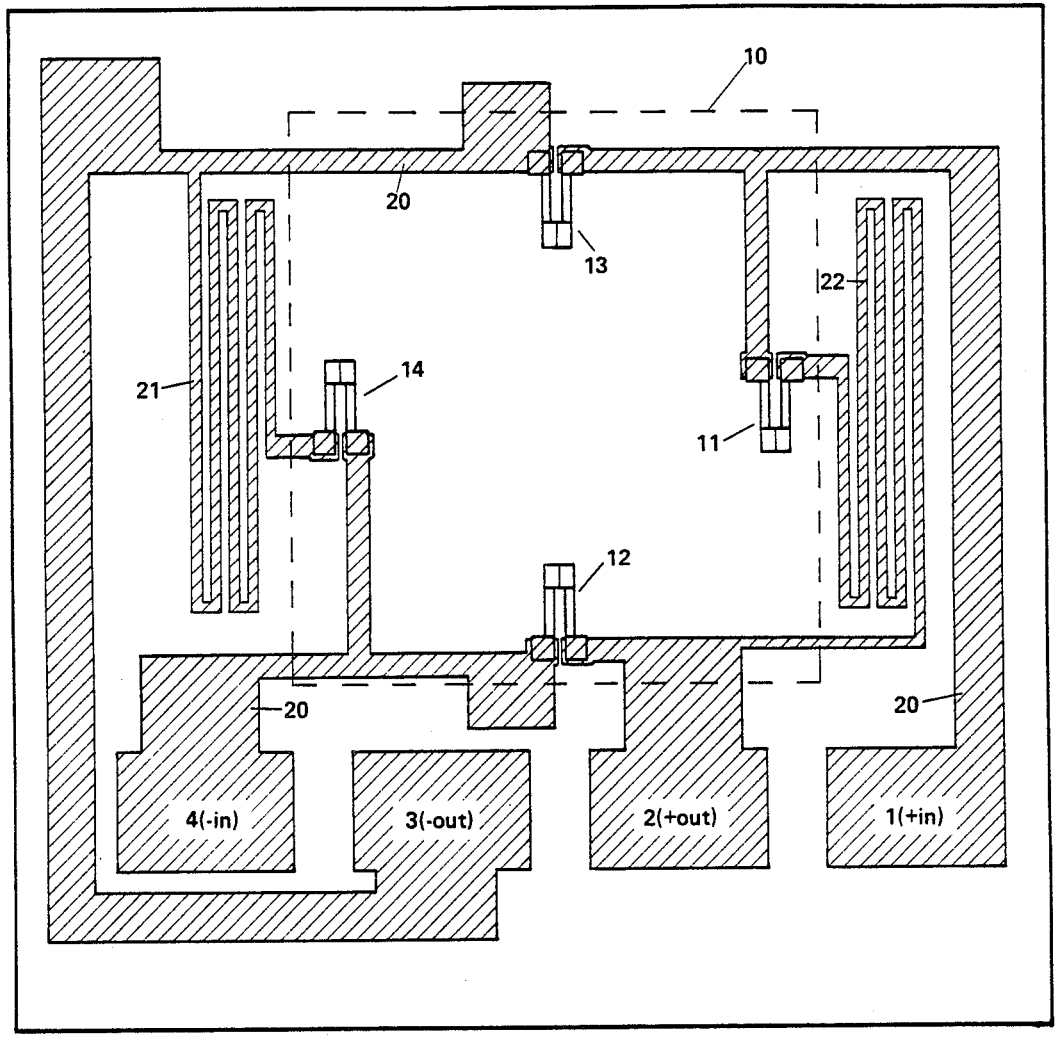
FIG. 2 is a plan view of a prior art diaphragm pressure transducer with zero TC resistors on the diaphragm chip.

Referring to FIG. 2, the transducers of FIG. 1 has been modified by the addition of zero TC resistors 21 and 22. Resistors 21 and 22 are typically 5-10 ohm aluminum resistors (TCR=3900 ppm/deg C.). Note that resistors 21 and 22 are part of the bridge circuit and thus affect the bridge balance. Aluminum is generally chosen since the metallization is also aluminum and thus saves several processing steps. Note also that resistors 21 and 22 are deposited outside of diaphragm 10.

Figure 3:
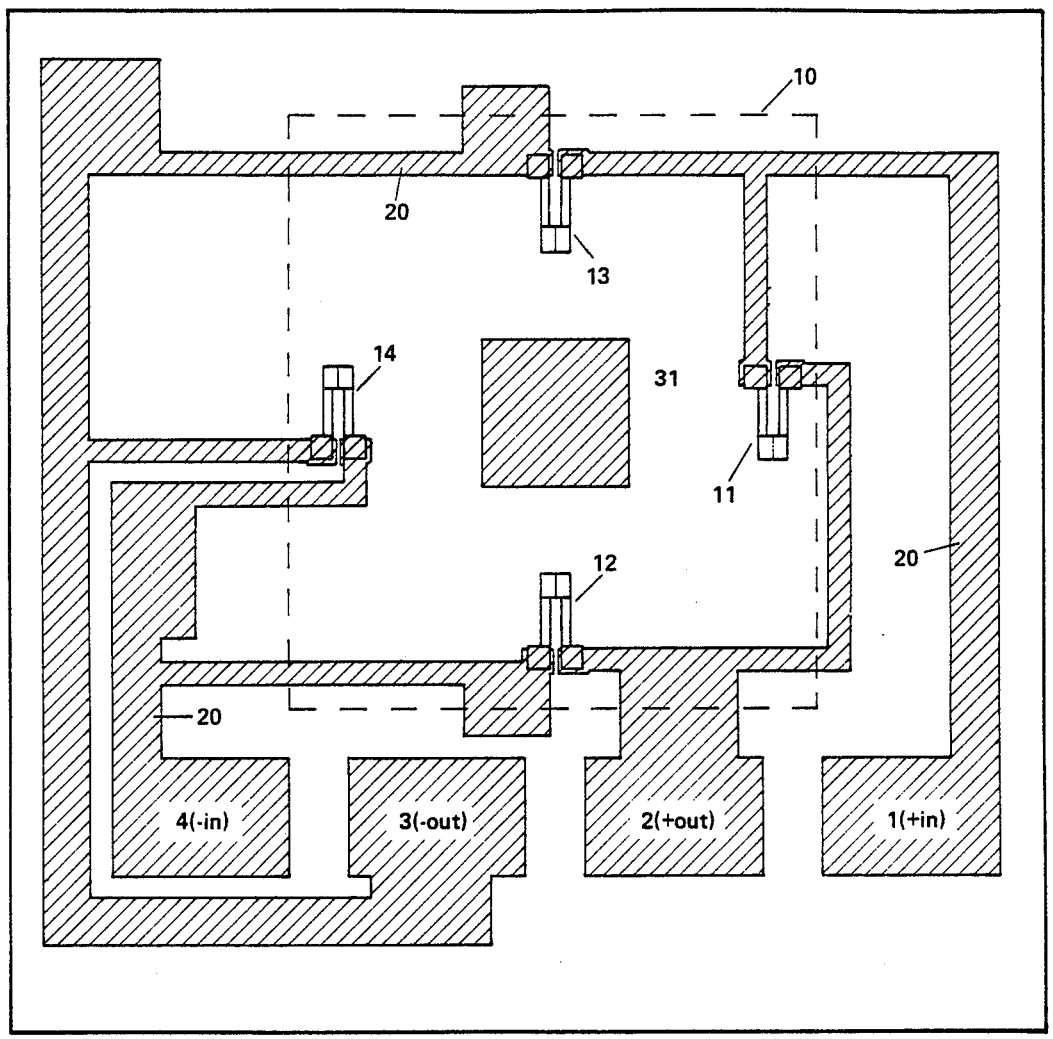
FIG. 3 is a plan view of a diaphragm pressure transducer with on chip and on diaphragm zero TC compensation.

Referring now to FIG. 3 is shown a preferred embodiment of the present invention. Here, the transducer of FIG. 1 has been modified by the addition of compensation layer 31. Layer 31 is shown centrally located on diaphragm 10, away from resistors 11 through 14. Layer 31 is not part of the bridge circuit and provides independent zero TC compensation.

A typical miniature diaphragm sensor has an etched silicon diaphragm of the order of 15 microns thick and a thermally grown silicon dioxide insulation layer of the order of 0.65 microns thick. Since the thermal expansion coefficient of silicon is about 2.6 ppm/deg. C. and the thermal expansion coefficient of silicon dioxide is about 0.5 ppm/deg. C., the diaphragm will become slightly concave as the temperature is increased and a non-zero TC will result. The addition of layer 31, formed of aluminum (25 ppm/deg C. thermal expansion coefficient) on the top surface (i.e. on the silicon dioxide) results in a zero TC of opposite sign. The magnitude of the resultant zero TC of the composite structure having three layers is primarily a function of the relative thicknesses, areas, and values of the linear expansion coefficients of the aluminum, silicon, and silicon dioxide that form the composite diaphragm.

Figure 4A:
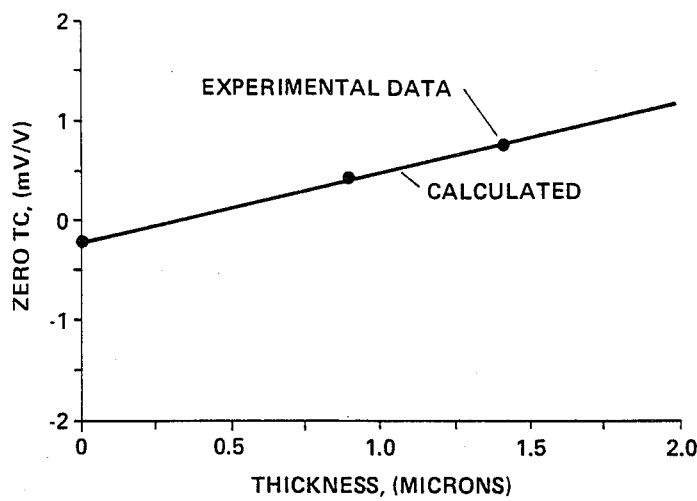
FIGS. 4A and 4B are graphs of zero TC versus thickness and length, respectively, of the metallization layer.
Figure 4B:
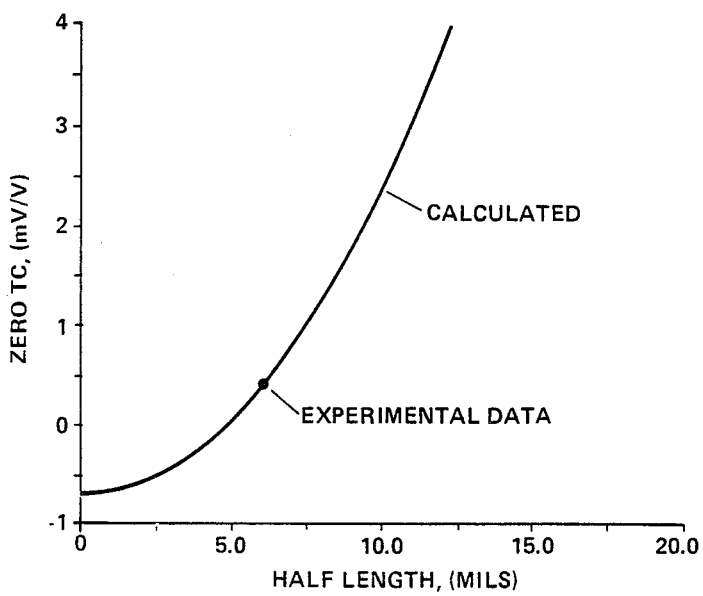

The size and thickness of the aluminum layer is determined by using the equations for bimetallic plate deformation due to uniform temperature (see, for example Roark and Young, *Formulas for Stress and Strain*, 5th Edition, McGraw Hill 1975 pp. 324-413). FIG. 4A is a graph of zero TC versus thickness of the metallization layer for both theoretical and experimental data. FIG. 4B shows a graph of zero TC versus length of a centrally placed aluminum square for both theoretical values and the experimental value determined from the following example.

EXAMPLE

An etched silicon diaphragm transducer having dimensions of 1000 by 1000 microns and 15 microns thickness with a silicon dioxide layer with 0.65 microns thickness was provided with a centrally located square of aluminum having dimensions 250 by 250 microns. Tests of several transducers made with this configuration indicated an average zero TC of −0.4 mm Hg/deg. C. as compared to a value of +0.4 mm Hg/deg C. for uncompensated transducers. The transducers were designed to have a negative zero TC since packaging of completed transducers introduces a positive zero TC in the range of 0.2 to 0.5 mm Hg/deg. C.

I claim:

1. An integrated circuit pressure transducer comprising:
    a diaphragm, said diaphragm being formed of a material having a first thermal expansion coefficient;
    measuring means for measuring the displacement of said diaphragm in response to an applied pressure including four piezoresistive resistors disposed on said diaphragm and connected as the elements of a Wheatstone Bridge circuit, said resistors being positioned on each near the edges of said diaphragm;
    an insulation layer covering said diaphragm and insulating said diaphragm from the circuit connections of said measuring means, said insulation layer being formed of a second material having a second thermal expansion coefficient; and
    a compensation layer on said insulation layer, said compensation layer including a body of material having a third expansion coefficient and being of a volumetric dimension selected to produce a predetermined value of temperature compensation in said transducer, the peripheral edges of said body being displaced laterally inwardly from said resistors.

2. The pressure transducer of claim 1 wherein said diaphragm is formed of silicon.

3. The pressure transducer of claim 2 wherein said insulation layer is formed of silicon dioxide.

4. The pressure transducer of claim 3 wherein said compensation layer is formed of aluminum.

5. The pressure transducer of claim 4 wherein said resistors are ion implanted in said diaphragm.

6. The pressure transducer of claim 1 wherein said compensation layer is positioned on the central portion of said diaphragm.

7. The pressure transducer of claim 6 wherein said compensation layer body is rectangular in shape.

8. The pressure transducer of claim 7 wherein said compensation layer body shape is square.

9. The pressure transducer of claim 1 including a circuit metallization material electrically connecting said resistors and in which said compensation layer is formed of said circuit metallization material.

* * * * *